3,118,928
ACRYLONITRILE PRODUCTION
William E. Garrison, Jr., Wilmington, Del., assignor to
E. I. du Pont de Nemours and Company, Wilmington,
Del., a corporation of Delaware
No Drawing. Filed Aug. 16, 1961, Ser. No. 131,718
2 Claims. (Cl. 260—465.3)

The present invention relates to a process for preparing acrylonitrile.

Acrylonitrile is a highly important chemical compound which is widely used in the preparation of valuable polymeric products finding commercial utility in the textile rubber, and plastics field. In addition, as a chemical intermediate this nitrile can be used in the synthesis of antioxidants, pharmaceuticals, dyes, surface active agents, etc.

Propane is a source of carbon which is lower in cost than are any of the sources presently used in the manufacture of acrylonitrile. Therefore, a process based on this hydrocarbon offers economic advantages provided satisfactory yields of acrylonitrile can be obtained. However, as is known, a large number of products are formed by the oxidation of propane. As described in an article by N. N. Semenov in Chimie et industrie 79, 3–10 (1958), the reaction of propane with oxygen gives rise to numerous products, chiefly of shorter carbon chain length than propane, e.g., formaldehyde, acetaldehyde, ethyl and methyl alcohols, methane, ethane, ethylene, propylene, hydrogen, and hydrogen peroxide. Consequently, in a reaction of propane, oxygen, and ammonia, a large number of shorter-chain products would be expected to form, and the formation of one particular product, especially one having the same number of carbons as the starting hydrocarbon, in preponderant amounts is highly unexpected.

It has now been discovered that when propane, oxygen, and ammonia are contacted at a temperature of at least about 500° C. with a catalyst containing combined tungsten oxide and tin oxide, acrylonitrile is obtained in yields as high as 64%, based on the amount of ammonia reacted. In this process very little of the propane is converted to by-products, and the unreacted propane therefore can be recovered, if desired, and recycled to the reactor.

A critical feature of the present process is the use of a catalyst comprised of combined oxides of tin and tungsten. Such a catalyst can be prepared from solutions of salts of tin and tungsten by evaporation or precipitation methods, and heating of the residues at temperatures in the range of 400° to 900° C. to drive off volatiles. For example, tin-tungsten oxides can be prepared by (1) evaporating an aqueous solution of a stannous or stannic chloride and ammonium metatungstate; or (2) forming a precipitate from an acidified (preferably to pH 0.6–2) aqueous solution of the above salts. Thereafter, the residues are fired in air at 400–900° C.

The conversions and yields obtained are dependent on such reaction variables as the proportion of reactants in the feed mixture and the time of contact between the feed mixture and the catalyst. Preferably, the volume of propane in the feed mixture will be about one or more times the volume of the ammonia. I have found that propane/ammonia ratios of about 1/1 to about 7/1 are preferred. Preferably, the volume of oxygen in the feed mixture will be about two or more times the volume of the ammonia. Oxygen/ammonia ratios of about 2/1 to about 8/1 are satisfactory. Preferably, the propane/oxygen ratio is not much greater than about 3.5/1.

The time of contact between the feed mixture and the catalyst, as determined by the flow rate of the reactants and the dimensions of the catalyst bed, may vary. In general, contact times in the range of 0.5 to 3 seconds are satisfactory. As the contact time increases, however, there is a greater chance that propane will be degraded.

If desired, the reaction of propane, ammonia, and oxygen may be effected in the presence of an inert diluent, for example, steam, nitrogen, or carbon dioxide. Dilution of the feed mixture may be accomplished by the use of air as the source of oxygen.

The present process is carried out at a temperature of at least about 500° C. Preferably, temperatures within the range of 550° C. and 700° C. are employed. In general, the absence of a diluent permits operation at the lower temperatures.

The following examples serve to illustrate specific embodiments of the process of the present invention. However, they will be understood to be illustrative only and not as limiting the invention in any manner. The term "conversion" used in the examples, refers to the relationship, expressed in percent, between the moles of acrylonitrile obtained and the moles theoretically obtainable from the moles of ammonia fed to the reaction zone. "Yeld" expresses the relationship between the moles of acrylonitrile obtained and the moles theoretically obtainable based on the ammonia consumed in the reaction (i.e., the moles fed to the reactor less the moles of unreacted ammonia recovered).

In all of the experiments described in the examples, the reactor used was a U-tube fabricated from 0.5-inch "Inconel" tubing. The reactor tube was heated in a bath of molten lead contained in a well-insulated "Inconel" vessel 2 in. x 5 inch. x 26 in. deep. The reaction temperatures given in the examples refer to the average temperature of the lead bath. The pressure was one atmosphere. Prior to entering the reactor, the reactant gases were mixed in a separate vessel and heated to about 350° C. in a preheater mounted directly above the reactor tube. Gas flows are stated as milliliters per minute at room temperature.

*Example 1*

A catalyst was prepared as follows:
Ammonium metatungstate (168.6 grams) was dissolved in 500 milliliters of water. To this solution was added 60 milliliters of concentrated ammonium hydroxide. Stannous chloride dihydrate (135.6 grams) was dissolved in 90 milliliters of water, to which was added 9 drops of concentrated hydrochloric acid. The stannous chloride solution was added rapidly with stirring to the tungsten solution. A heavy greenish-yellow flocculate was produced, and 200 milliliters of water was added to thin the mixture. After 15 minutes, the mixture was filtered (pH of filtrate=1.8). The filter cake was washed well with water, dried, heated at 500–550° C. for 3 hours in air, and powdered in a mortar (161 grams obtained). Polarographic analysis showed that the Sn/W ratio in the composition was 1/1. Powdered catalyst material prepared in this manner was packed into the above-described reactor, and the reactant gases were passed through the recator. When used in an unsupported condition, the catalyst powder was used in tablet form. When used in a supported form, the powder was applied to the support material by suspending the powder in water and evaporating the water in a rotary film evaporator in the presence of a weighed amount of the support material. The resulting material was dried and the excess catalyst powder removed by sieving. Reaction conditions and results are given in the following table. In all of the experiments except Expts. 6 and 8, 360 ml./min. of steam was fed to the reactor along with the reactant gases.

| Expt. No. | Reactant Feed Rate (ml./min.) | | | Reactant Ratios Propane/NH₃/O₂ (vol.) | Condition of Catalyst | Av. Temp. (°C.) | Acrylonitrile (based on NH₃) | | Reactants Recovered | |
|---|---|---|---|---|---|---|---|---|---|---|
| | Propane | NH₃ | O₂ | | | | Percent Conv. | Percent Yield | Percent Propane | Percent Ammonia |
| 1 | 174 | 45 | 119 | 3.9/1/2.6 | 16% on SiC (100 cc.) | 622 | 42.5 | 64 | 78 | 34 |
| 2 | 175 | 46 | 125 | 3.8/1/2.7 | 13% on 3/16-in. α-Al₂O₃ spheres. Surface area less than 1 sq.m./g. (100 cc.). | 617 | 33.6 | | 68 | |
| 3 | 179 | 49 | 145 | 3.6/1/3 | 15% on 3/16-in. SiO₂ beads. Surface area less than 1 sq.m./g. (100 cc.). | 630 | 32.8 | | 68 | |
| 4 | 169 | 27 | 152 | 6.3/1/5.6 | 16% on SiC. Surface area 1.6 sq.m./g. (100 cc.) | 658 | 42.9 | 50 | 70 | 14 |
| 5 | 102 | 32 | 65 | 3.2/1/2 | ___do___ | 645 | 32.5 | 52 | 78 | 37 |
| 6 [1] | 97 | 24 | 65 | 4/1/2.7 | ___do___ | 678 | 31.5 | | 82 | |
| 7 | 163 | 51 | 365 | 3.2/1/7.2 | ___do___ | 671 | 32.0 | | 35 | |
| 8 [2] | 172 | 43 | 122 | 4/1/3 | Unsupported catalyst in tablet form; 30 cc. | 576 | 38.9 | 60 | 77 | 35 |

[1] 720 ml./min. of steam added to gas mixture. [2] No steam added.

Example 2

A catalyst was prepared as follows:

Ammonium metatungstate (168.6 grams) was dissolved in 600 milliliters of water. A solution of 210 grams of stannic chloride pentahydrate in 200 milliliters of water was added to the tungstate solution, and a few drops of hydrochloric acid were added to clarify the resulting solution, which was then evaporated to dryness under reduced pressure. The residue was heated for 3 hours at 520° C. and powdered (137.6 grams).

This powder was applied to an α-alumina support (3/16-inch spheres; surface area less than 1 sq. m./g.) in the manner described in Example 1 to give 13% of the catalyst powder, based on total weight of supported catalyst. One hundred cubic centimeters of this catalyst was placed in the above-described reactor operating at 574° C. and at a feed rate of 186 ml. of propane, 46 ml. of ammonia, and 107 ml. of oxygen per minute. No steam was added. The conversion of ammonia to acrylonitrile was 30%; the yield was 36%.

Example 3

A catalyst was prepared as follows:

A solution of 65.2 grams of ammonium metatungstate and 70 grams of stannic chloride pentahydrate in 300 milliliters of water was heated under reflux for 24 hours. The resulting precipitate was filtered from the hot mixture, washed with water, and heated in air at 500–550° C. for 3 hours (61.4 grams of powder obtained).

This powder was applied to a silicon carbide support (surface area=74 sq. m./g.) by the procedure described in Example 1 to give a supported catalyst containing 13% of the catalyst powder. When 100 parts of this catalyst was used in the reaction of propane, ammonia, and oxygen (169 ml. of propane, 44 ml. of ammonia, and 130 ml. of oxygen per minute) in the presence of stem (360 ml. per minute) at 640° C., the conversion of ammonia to acrylonitrile was 37%; the yield was 57%.

Example 4

A catalyst was prepared by the precipitation method of Example 3, except that sodium tungstate was substituted for the ammonium metatungstate. A solution of 70.3 grams of stannic chloride pentahydrate in 150 milliliters of water was poured into a solution of 66 grams of sodium tungstate dihydrate in 300 milliliters of water. A white flocculate formed immediately. After the addition of 50 milliliters of concentrated hydrochloric acid to bring the suspension to pH 0.66, the suspension was allowed to stand for 1 hour, after which it was filtered. The filter cake was dispersed in water and boiled briefly; the resulting suspension was filtered, and the filter cake washed 3 times with cold water, and heated for 3 hours in air at 580° C. (51 grams of powder obtained). A supported catalyst prepared from this material (9% on SiC; 100 cc.) gave a 35% conversion (52% yield) of ammonia to acrylonitrile at 619° C. and a feed rate of 174 ml. of propane, 42 ml. of ammonia, 115 ml. of oxygen, and 360 ml. of steam per minute.

The invention has been described in detail in the foregoing. It will be apparent to those skilled in the art that many variations are possible without departure from the scope of the invention. I intend, therefore, to be limited only by the following claims.

I claim:

1. A process for the preparation of acrylonitrile which comprises mixing propane, ammonia, and oxygen in the proportions of from about 1 to 7 volumes of propane for each volume of ammonia and from about 2 to 8 volumes of oxygen for each volume of ammonia and contacting the resulting mixture with a catalyst consisting essentially of combined oxides of tin and tungsten at a temperature of about 500° C. to 700° C. for about 0.5 to 3 seconds.

2. A process according to claim 1, wherein steam is present as a diluent.

References Cited in the file of this patent

UNITED STATES PATENTS

| | | |
|---|---|---|
| 1,934,838 | Andrussow | Nov. 14, 1933 |
| 2,445,693 | Porter et al. | July 20, 1948 |
| 2,518,295 | Denton et al. | Aug. 8, 1950 |